UNITED STATES PATENT OFFICE.

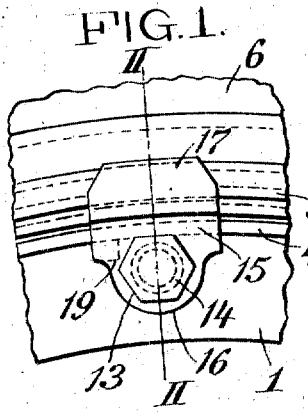
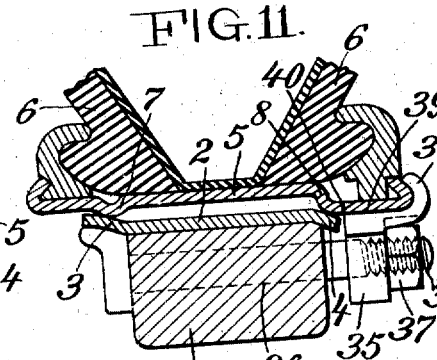
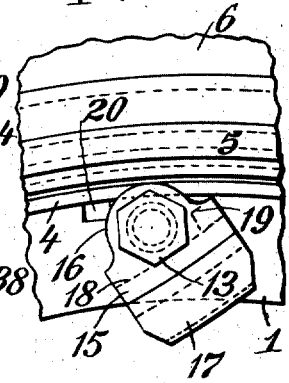
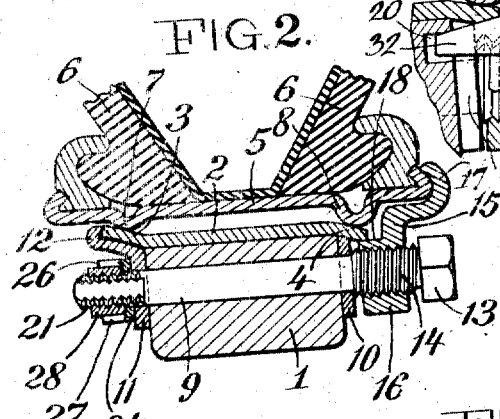
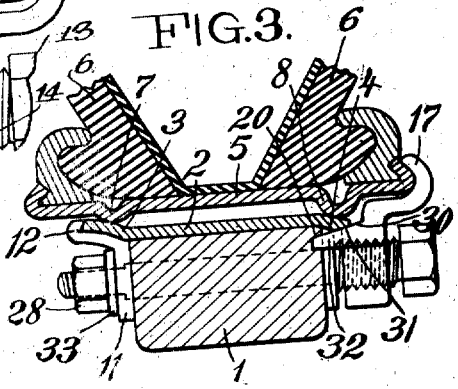
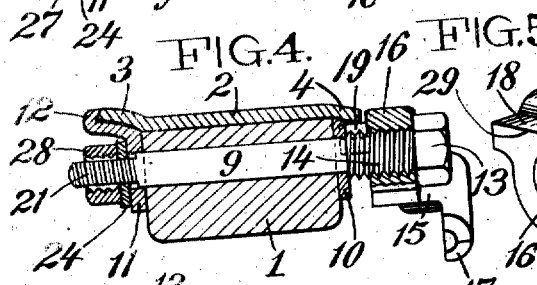
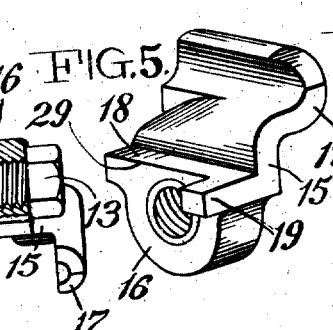
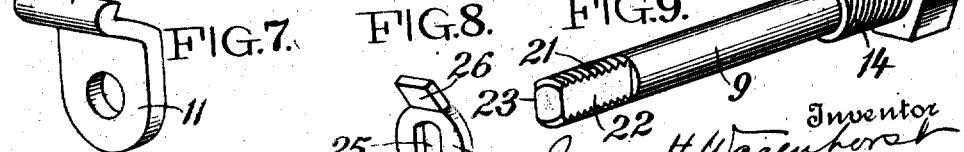

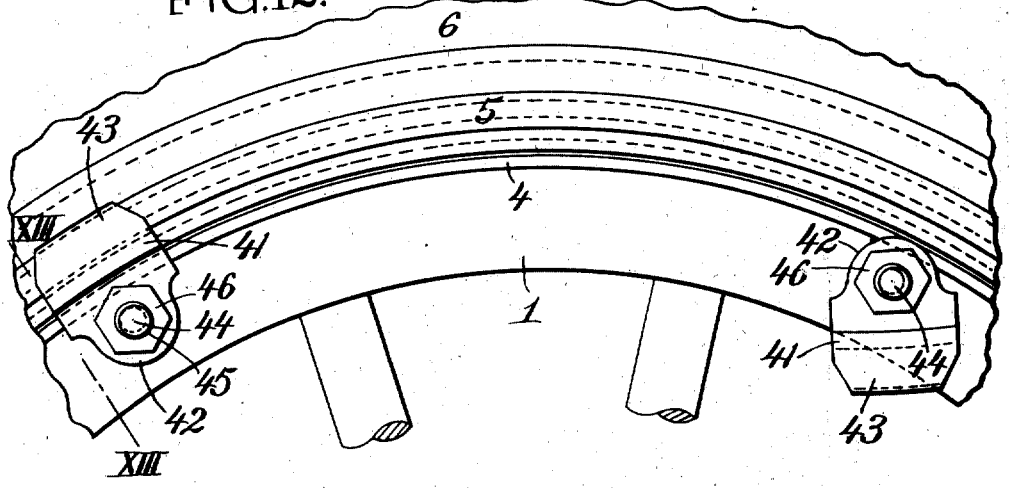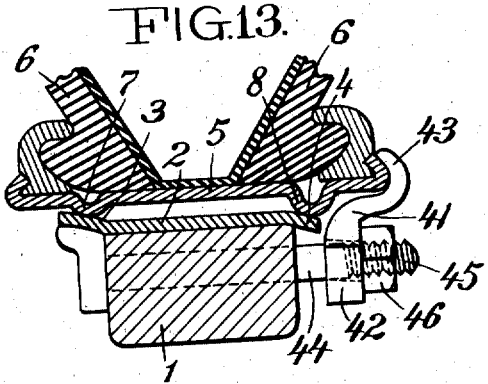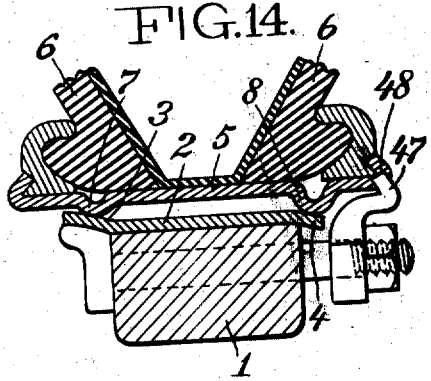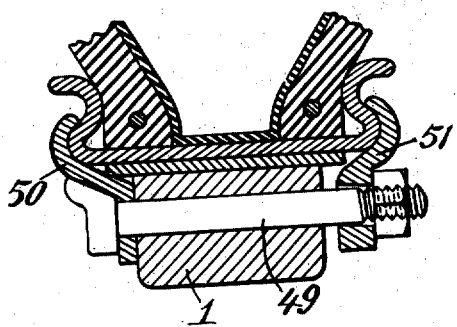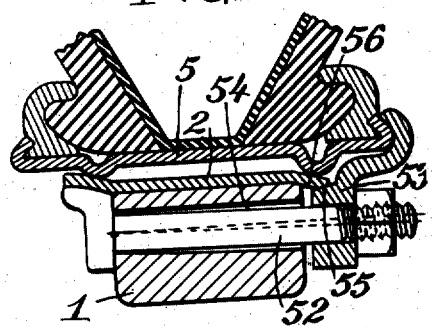

JAMES H. WAGENHORST, OF AKRON, OHIO, ASSIGNOR TO THE B. F. GOODRICH COMPANY, OF NEW YORK, N. Y., A CORPORATION OF NEW YORK.

VEHICLE-WHEEL RIM.

1,275,109.

Specification of Letters Patent.

Patented Aug. 6, 1918.

Application filed May 12, 1913. Serial No. 766,995.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

My invention relates particularly to that type of rim which is generally known as a "demountable rim", that is, a wheel structure having a removable rim capable of carrying a fully inflated tire, and means for detachably mounting the same upon the wheel structure.

In the accompanying drawings which form a part of this specification, Figure 1 is a side elevation of a portion of a vehicle wheel equipped with my improved device; Fig. 2 is a transverse sectional view on line II—II of Fig. 1; Fig. 3 is a transverse sectional view through a felly, rim and tire showing a modified form of my device; Fig. 4 is a view similar to Fig. 2 showing one of the retaining clips for locking the tire-carrying rim upon the wheel moved into inoperative position; Fig. 5 is a perspective view of this clip; Fig. 6 is a perspective view of a modified form of clip shown in Fig. 3; Fig. 7 is a perspective view of a flanged retaining member mounted on the opposite side of the felly from the clips; Fig. 8 is a perspective view of a special form of washer; Fig. 9 is a perspective view of a form of bolt particularly adapted for use in my improved structure; Fig. 10 is a view similar to Fig. 1 showing a side elevation of Fig. 4; Fig. 11 is a transverse sectional view of a felly, rim and tire showing a further modified form of retaining clip; Fig. 12 is a side elevation of a rim equipped with a modification; Fig. 13 is a transverse sectional view on line XIII—XIII of Fig. 12; Figs. 14, 15 and 16 are transverse sectional views illustrating further modifications, and Fig. 17 is an enlarged fragmentary section corresponding to Fig. 3 and showing the tilting action of the screw-threaded clip.

Referring to the drawings in detail, the numeral 1 designates the felly of a vehicle wheel, to which is permanently secured, by shrinking or in any other suitable manner, the felly band 2 which is provided at its edges with the flanges 3 and 4 inclined in the same direction and which form frusta of concentric cones. Mounted upon this felly band is a removable tire-carrying rim 5 supporting the tire 6. This rim may be of either the "quick-detachable" or clencher type. Its base is shown provided with the depressed portions 7 and 8 adapted to seat upon the flanges 3 and 4, respectively. The wheel is equipped at equally spaced intervals about its periphery with means for securing the tire-carrying rim in place upon the felly band. Each of these means comprises a bolt 9 passing laterally through the felly, and through a washer 10 at one side of the felly and a clip 11 at the other side, this clip being provided with an outwardly extending hooked flange 12 adapted to engage the flange 3 and support the same, as shown in Fig. 2. At one end of the bolt is a faced head portion 13 between which and the shaft of the bolt is an externally threaded section 14, upon which is adapted to be mounted a rim-engaging clip 15. This clip consists of the internally threaded body portion 16 and a claw or hooked extension 17 integral therewith. The upper surface of the body portion adjacent to the hooked extension is made substantially flat, as shown at 18. Adjacent to this surface and extending from the body portion is a lug 19 which may in certain constructions enter a socket 20 in the felly when the clip is in the operative position shown in Fig. 2. The portion of the bolt remote from that which supports the clip 15 is externally threaded at 21, the metal of the bolt being faced off at 22 and 23 to form two flat sides. This threaded section of the bolt passes through a washer 24 having a rectangular opening 25 whose lesser dimension is smaller than the diameter of the bolt. This washer may be circular in shape or may be formed as shown in Fig. 8, with the two extensions 26 and 27. The threaded end of the bolt also carries a nut 28, and when the washer of the type shown in Fig. 8 is used, the extensions 26 and 27 are bent down, as shown in Fig. 2, to embrace opposite faces of the nut, so that there can be no relative turning between the nut and the bolt after the former is once in place. I do not, however, regard the use of the extensions 26 and 27 as requisite, but merely as an additional safeguard to prevent the nut from leaving the bolt.

When the parts are in the relative positions shown in Fig. 2, the rotation of the bolt by means of applying a wrench to the head 13 will cause the clip 15 to back away from the edge of the tire-carrying rim which it embraces until the flat portion 18 clears the edge of the flange 4 and the hooked portion 17 is freed from the edge of the rim. The continued rotation of the bolt will then cause the clip to swing inwardly toward the center of the wheel, into substantially the position shown in Fig. 10, thus permitting the tire-carrying rim and tire to be removed as a unit from the wheel.

When it is desired to mount a tire and rim upon the wheel, the removable rim is placed with the depressed portions 7 and 8 lightly resting against the flanges 3 and 4. By rotating the bolt in the opposite direction from that which causes the release of the clip from the rim, the clip will rotate until the extension 19 engages the underportion of the flange 4. Further rotation of the bolt will then cause the clip to move laterally toward the rim until the hooked portion 17 engages the edge of the tire-carrying rim and the edge 29 of the face 18 simultaneously passes under the edge of the flange 4. The clip will then begin to exert a double influence upon the tire-carrying rim. As the clip is forced toward the felly it will carry with it the rim and move the depressed portions 7 and 8 laterally, forcing them to ride higher and higher upon the inclined flanges 3 and 4, thereby locking the tire-carrying rim securely upon the felly band. At the same time the clip prevents the edge of the rim which it engages from progressing radially outward away from the center of the wheel and thus obviates the tendency of the removable rim and tire to tilt with respect to the felly band when the rim is forced home upon the felly band. This tendency, when the rim is forced home by means of keepers exerting only a lateral pressure upon the rim, is liable to result in distortion of the tire tread and an unequal wearing of the tire, besides producing eccentric strains within the rim and its associated parts. However, not only does the hooked portion of the clip restrain the edge of the rim from progressing radially away from the felly band, but it also impresses a force upon the edge of the rim obliquely inward, which actually tends to draw the rim laterally and inwardly toward the center of the wheel, thus clamping the rim firmly in place. The drag on the edge of the rim inwardly toward the center of the wheel is made possible to some extent by the slight canting of the clip on the bolt as shown in Fig. 17, i. e., tilting of the clip in a plane perpendicular to the wheel, which results from the portion of the clip in engagement with the rim advancing more slowly toward the wheel than does the part engaging the bolt. It is further produced by wedging reaction between the surfaces 30, 31, and this reaction may be the sole or principal resultant of the axial movement of the bolt, tending to cause inward radial clamping of the rim against its seat, as hereinafter described in connection with Fig. 16. The rim-engaging portion of the clip thus travels radially inward as well as laterally of the wheel, and drags the rim with it. Furthermore, it will be evident that the force which acts to draw the rim toward the center of the wheel coöperates with the collapsing pressure of the inflated tire.

The engagement of the bottom of the flange 4 with the surface 18 reduces the strain upon the threaded portion of the bolt carrying the clip. When a structure such as that shown is used, the clip moves toward the felly smoothly and without excessive lateral strain upon the bolt, i. e., pull in the direction of the clip, at the same time forcing the seats of the tire-carrying rim against their respective flanges.

In Fig. 3 I have shown a modification in which the face 18 is replaced by a wedge surface 30 engaging the inclined edge 31 of the flange 4 on the felly band. In this type the rectangular lug 19 is replaced by the circular lug 32. The operation of this form is similar to that of the structure shown in Fig. 2, except that the fulcruming force acting upon the member 17 is greater because of the engagement of the wedging surfaces instead of the surfaces parallel to the axis of the bolt, as in the case of the rim shown in Fig. 2. In Fig. 3 I have also shown a plain washer 33 in place of the washer 24 having the extensions 26 and 27 illustrated in Figs. 2 and 8. It will be apparent that when such a washer is used it will necessarily rotate with the bolt and will carry the nut with it as it rotates.

Fig. 11 illustrates a broadening of the principle already described, in which the force preventing undue strain upon the bolt is received from engagement of the clip with the tire-carrying rim itself, instead of with a fixed portion of the wheel, as in the forms already described, but this form does not involve the drawing inwardly of the rim against its seat by wedging reaction or by tilting of the clip, or both. In this type the clip comprises a hooked portion 34 engaging one edge of the tire-carrying rim and a body portion 35 adapted to be mounted upon a bolt 36 permanently secured to and passing through the felly 1. A nut 37 adapted to be mounted on the threaded end 38 of the bolt is used for forcing the clip toward the felly of the wheel. In this type, instead of providing a bearing surface on the lower part of the flange 4 of the felly band with which the clip may engage, I provide a long, substantially horizontal bearing surface 39 adjacent to the hooked portion of the clip and adapted to seat solidly against the portion of the tire-carrying rim adjacent to the flange which is gripped by the hooked portion of the clip. It will be seen that because of this long bearing surface and over-hang, there is little eccentric or lateral strain brought upon the bolt, since in order for the clip to swing about an axis perpendicular to the plane of the drawing, it will be necessary for the rim itself to yield between the point 40 and the extreme edge, something which is substantially impossible because of the stiffness of the rim in this plane afforded by the inturned flange of the rim.

In Figs. 12 and 13 I have illustrated a modification in which a keeper 41 is used that does not project beneath the felly band, nor has it a long bearing surface adapted to support the lower surface of the rim, as in the case of the structure shown in Fig. 11. Figs. 12 and 13 illustrate one of the simplest embodiments of my invention. The clip or keeper 41 is provided with a body portion 42, from which extends the hooked member 43 overlying the edge of the detachable rim to such an extent that the clip may tilt or cant upon the bolt 44 through an appreciable angle without releasing the edge of the rim. In Figs. 12 and 13 the bolt 44 is shown to be fixed to the felly and has its end threaded at 45 to engage a nut 46 which retains the clip in place.

In order to permit the tilting or canting of the clip, in this form as well as in the types previously described, the clip is designed to fit loosely upon its retaining member. This may be accomplished in the preceding forms by a loose fitting of the threads, or in the structure shown in Figs. 12 and 13 by making the hole through the clip of slightly greater diameter than the bolt on which it is mounted, as indicated by the dotted lines in Fig. 12. The latter forms, however, and that in Fig. 15, while they permit tilting of the clip, do not relieve the bolt of the radial strain.

Fig. 14 illustrates that it is not requisite that the clip shall extend over and embrace the edge of the rim. In place of the hooked portion 43, I may substitute an offset lug 47 on the clip entering a pocket 48 in the edge of the rim, or any other suitable connection between the clip and rim which is capable of transmitting to the rim the oblique drag already described in detail.

In place of a continuous flange about the edge of the rim opposite to the clips, I may use a plurality of keepers carried by the same retaining means on which the detachable clips are mounted. I have shown this type of rim in Fig. 15, in which the bolts 49 at one side of the felly support the keepers 50, and at the other side the detachable clips 51, which may be similar to the clips 41 described in connection with Figs. 12 and 13.

In Fig. 16 I have shown that the bolts 52 on which the keepers 53 are mounted may pass through openings 54 through the fixed wheel member of greater diameter than the bolts. In this case each keeper or clip 53 has a surface 55 adapted to engage some portion of the fixed wheel member, such as the extension of the felly band 56. The inward pull of the clip upon the rim is thus accomplished entirely by the movement of said clip (carrying with it the bolt when there is, as in this view, no substantial enlargement of the bolt-hole in the clip) toward the center of the wheel, or by a combination of this action with the cant or tilting of the clip. This construction is particularly desirable in the case of wooden fellies, since it prevents any crushing of the wood surrounding the bolt.

While I have illustrated and described certain preferred embodiments of my device, I appreciate that my invention is susceptible of broad application, and I do not desire to be limited to the precise structure shown and described.

Having thus described my invention, I claim:

1. In a vehicle wheel, in combination, a fixed wheel member, a detachable rim therefor, and a locking element having engagement with the detachable rim and with a part of said wheel member and adapted to be drawn laterally by a bolt carried by said wheel member and to draw said detachable rim radially inward to its seat by wedging reaction therewith.

2. In a vehicle wheel, in combination, a fixed wheel member, a detachable rim therefor, a retaining clip having a portion for engaging a peripheral portion of said rim, and means for tilting said clip radially inward into wedging engagement with said fixed wheel member.

3. In a vehicle wheel, in combination, a fixed wheel member, a rim therefor, and a common retaining member carried by a bolt in said wheel member and adapted to exert a force upon said rim in a radial direction by the engagement of said retaining member with the fixed wheel member independently of said bolt.

4. The combination with a wheel and its fixed rim of a demountable rim therefor, a locking element having a portion engaging the outer edge of the rim, and means to tilt said locking element inwardly into wedging engagement with a portion of said fixed rim.

5. The combination with a wheel and its felly band of a demountable rim therefor, laterally spaced substantially frustum shaped seating surfaces on said rim and corresponding laterally spaced substantially frustum shaped seating surfaces on said felly band engaging with the seating surfaces on said rim, a clamping element having a hooked portion engaging the edge of the rim, adapted to be moved laterally and thereby to exert pressure radially inward upon the edge of said rim, and pressure laterally upon said rim to cause said seating surfaces to engage and exert pressure radially outward upon said rim, and means for forcing said clamping element laterally of the wheel.

6. In a vehicle wheel, in combination, a fixed wheel member, a detachable tire-carrying rim therefor, and a locking element comprising a clip having a portion engaging the edge of the rim, and a second portion offset from the first portion in the direction of the wheel forming a support to limit the displacement of the clip in a plane perpendicular to the plane of the wheel, and means for moving the clip toward the fixed wheel member in a plane perpendicular to the plane of the wheel.

7. In a vehicle wheel in combination, a fixed wheel member, a detachable tire-carrying rim, mutually engaging seating surfaces on said rim and member, and means for forcing said seating surfaces into engagement comprising a clip having a hooked portion engaging one edge of the rim and a second portion offset from the hooked portion in the direction of the wheel, the elements of the surface of which are substantially parallel to the rim base, said surface forming a support to limit the displacement of the clip in a plane perpendicular to the plane of the wheel, and means for forcing the clip toward the fixed wheel member in a direction perpendicular to the plane of the wheel.

8. A clamping device for rims mountable upon and laterally removable from the felly of a vehicle wheel, comprising a laterally projecting member underlying, and a hooked clamping member engaging, a portion of the rim, said lateral member being substantially out of contact with said rim when said hooked member is in engagement therewith, a bolt passing through said felly, threaded connection between said bolt and device; means for rotating said bolt, and means for retaining it from withdrawal during rotation, said means permitting movement of the clamping device toward the rim and into operative engagement therewith.

9. In a vehicle wheel in combination, a fixed wheel member, a detachable tire-carrying rim, mutually engaging seating surfaces on said rim and member and means for forcing said seating surfaces into engagement and simultaneously drawing said rim toward the center of the wheel, said means comprising a clip having a portion adapted to engage the tire-carrying rim and a second portion adapted to engage the fixed wheel member, the intermediate portion of the clip being substantially out of engagement with said rim when said hooked portion is in engagement therewith, and means for forcing said clip into engagement with said rim.

10. In a vehicle wheel in combination, a fixed wheel member, a detachable tire-carrying rim, mutually engaging seating surfaces on said rim and member and a clip comprising a hooked member and a positioning member, said hooked member being adapted to engage the edge of the rim and said positioning member being adapted to engage said fixed wheel member and means for clamping said rim and fixed wheel member between the hooked and positioning members of the clip and thereby forcing the rim upon the wheel member and simultaneously drawing the same toward the center of the wheel.

11. In a wheel in combination, a felly and its band, a tire-carrying rim, said rim and band having mutually engaging surfaces, a clip having a hooked member to engage said rim and a positioning member to engage said band, and means for forcing said clip toward said wheel, said means permitting a limited movement of said clip in a plane perpendicular to the plane of the wheel.

12. In a vehicle wheel in combination, a fixed wheel member, a detachable tire-carrying rim, mutually engaging seating surfaces on said rim and member, and means for forcing said surfaces into engagement comprising a clip having a hooked portion engaging one edge of the tire-carrying rim adapted to prevent relative movement between the rim and clip in a direction away from the center of the wheel, an abutment on said fixed wheel member adapted to engage said clip and limit the displacement thereof in a plane perpendicular to the plane of the wheel, and means for forcing the clip toward the fixed wheel member in a direction perpendicular to the plane of the wheel.

13. In a vehicle wheel, in combination, a fixed wheel member, a detachable tire-carrying rim, mutually engaging seating surfaces on said rim and member, and means for forcing said seating surfaces into engagement comprising a clip having a portion engaging one edge of the tire-carrying rim and adapted to prevent relative movement between said rim and clip in a direction away from the center of the wheel, a bearing surface on said clip, and an abutment on said fixed wheel member, said bearing surface engaging the under side of said abutment, and means for forcing the clip toward the fixed wheel member in a direction perpendicular to the plane of the wheel.

14. In a vehicle wheel, in combination, a fixed wheel member, a detachable tire-carrying rim, mutually engaging seating surfaces on said rim and member, and means for forcing said seating surfaces into engagement comprising a clip having a portion engaging one edge of the tire-carrying rim and adapted to prevent relative movement between said rim and clip in a direction away from the center of the wheel, a bearing surface on said clip, said surface being situated nearer to the center of the wheel and to the fixed wheel member than the said hooked portion, an abutment on said fixed wheel member, said bearing surface engaging the under side of said abutment, and means for forcing the clip toward the fixed wheel member in a direction perpendicular to the plane of the wheel.

15. In a vehicle wheel in combination, a felly, a felly band thereon having flanges about the edges thereof, the flange nearer the center of the wheel extending beyond said felly, a detachable tire-carrying rim having seating surfaces adapted to engage said flanges, and means for forcing said seating surfaces into engagement therewith, comprising a clip having a hooked portion engaging one edge of the tire-carrying rim, and a portion adapted to engage the inner surface of the flange of smaller radius, and means for forcing the clip toward the felly in a direction perpendicular to the plane of the wheel.

16. A retaining clamp for demountable vehicle wheel rims comprising a portion adapted to engage an edge of a rim, a base portion adapted to engage means to secure the clamp to the wheel, and a stop on said base portion projecting from that face of the clamp which is normally adjacent to the wheel and remote from the rim engaging portion of the clamp.

17. A retaining clamp for demountable vehicle wheel rims comprising a hooked portion adapted to engage an edge of a rim, a base portion adapted to engage means to secure clamp to the wheel, and a stop on said base portion projecting from that face of the clamp which is normally adjacent to the wheel and remote from the rim engaging portion of the clamp.

18. The combination with a wheel and its felly of a demountable rim therefor, a locking element having a portion engaging the edge of the rim, means for moving said element toward and away from said wheel, and means remote from the portion of the element engaging the edge of the rim for limiting the movement of the element in a plane perpendicular to the plane of the wheel to maintain said rim-engaging portion in engagement with the said rim.

19. The combination with a wheel and its felly of a demountable rim therefor, a locking element having a portion engaging the edge of the rim, and a second portion extending laterally toward said felly, said second portion underlying said rim but out of contact therewith, and means adapted to permit said locking element to tilt and move toward said felly.

20. The combination with a wheel and its felly band of a demountable rim therefor, flanges upon said felly band, mutually engaging depressed portions upon said rim, a clip having a hooked portion engaging a corresponding hooked portion of the rim, and a laterally offset portion extending toward said felly band, said clip being adapted to move laterally and thereby to exert pressure radially inward upon the edge of said rim and to cause said depressions and flanges to engage, and means for forcing said clip laterally with respect to said wheel.

21. In a vehicle wheel, in combination, a felly, a felly band thereon having flanges adjacent its edges, one of said flanges being depressed and the other of said flanges being raised above the surface of said felly band, a detachable tire-carrying rim having seating surfaces adapted to engage said flanges, means for forcing said seating surfaces into engagement therewith comprising a clip having a portion engaging one edge of said rim and a portion contacting with said depressed flange, and means for forcing said clip toward said felly.

22. In combination, a fixed rim, a demountable rim thereon, and a clamping member adapted to exert first a lateral thrust against said demountable rim, to seat the same, and second a radial pull to retain the same upon its seat.

JAMES H. WAGENHORST.

Witnesses:
SEWARD DAVIS,
GERALD E. TERWILLIGER.